Oct. 7, 1930.    H. M. KELLER    1,777,754
AIR HOSE COUPLING
Filed Nov. 16, 1927    4 Sheets-Sheet 1
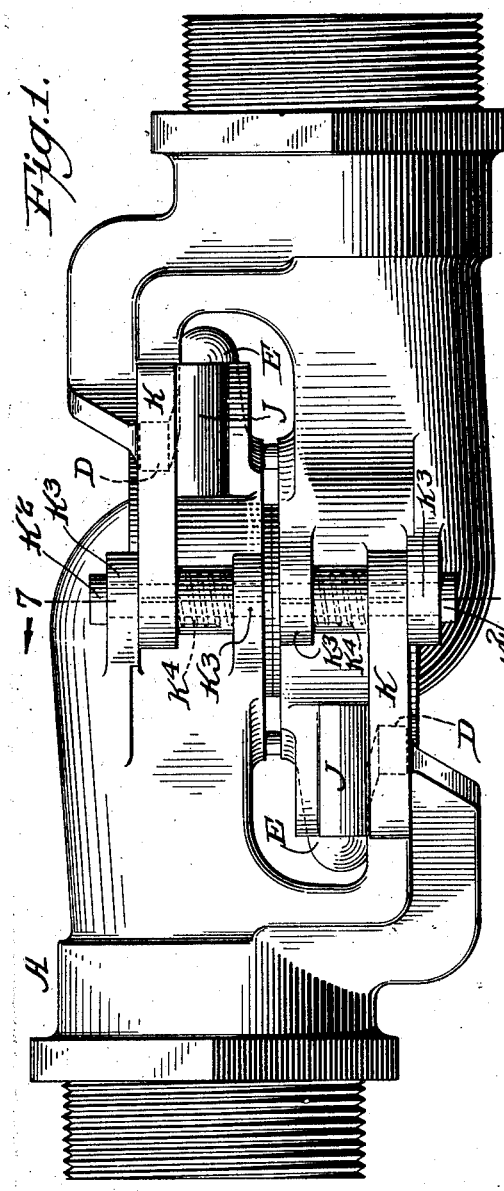
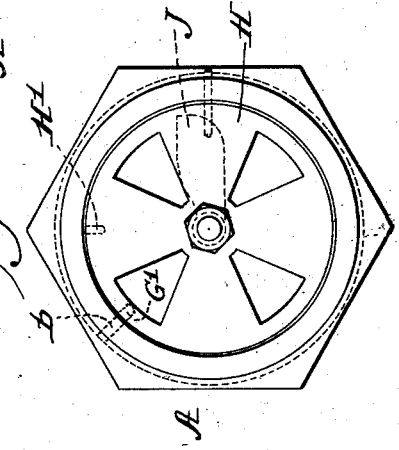
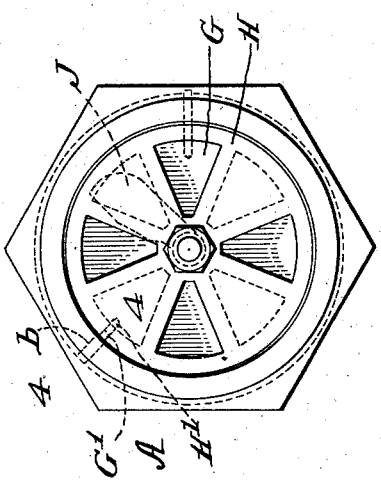
Inventor
Herbert M. Keller,
By
Attorney.

Oct. 7, 1930.    H. M. KELLER    1,777,754
AIR HOSE COUPLING
Filed Nov. 16, 1927    4 Sheets-Sheet 2
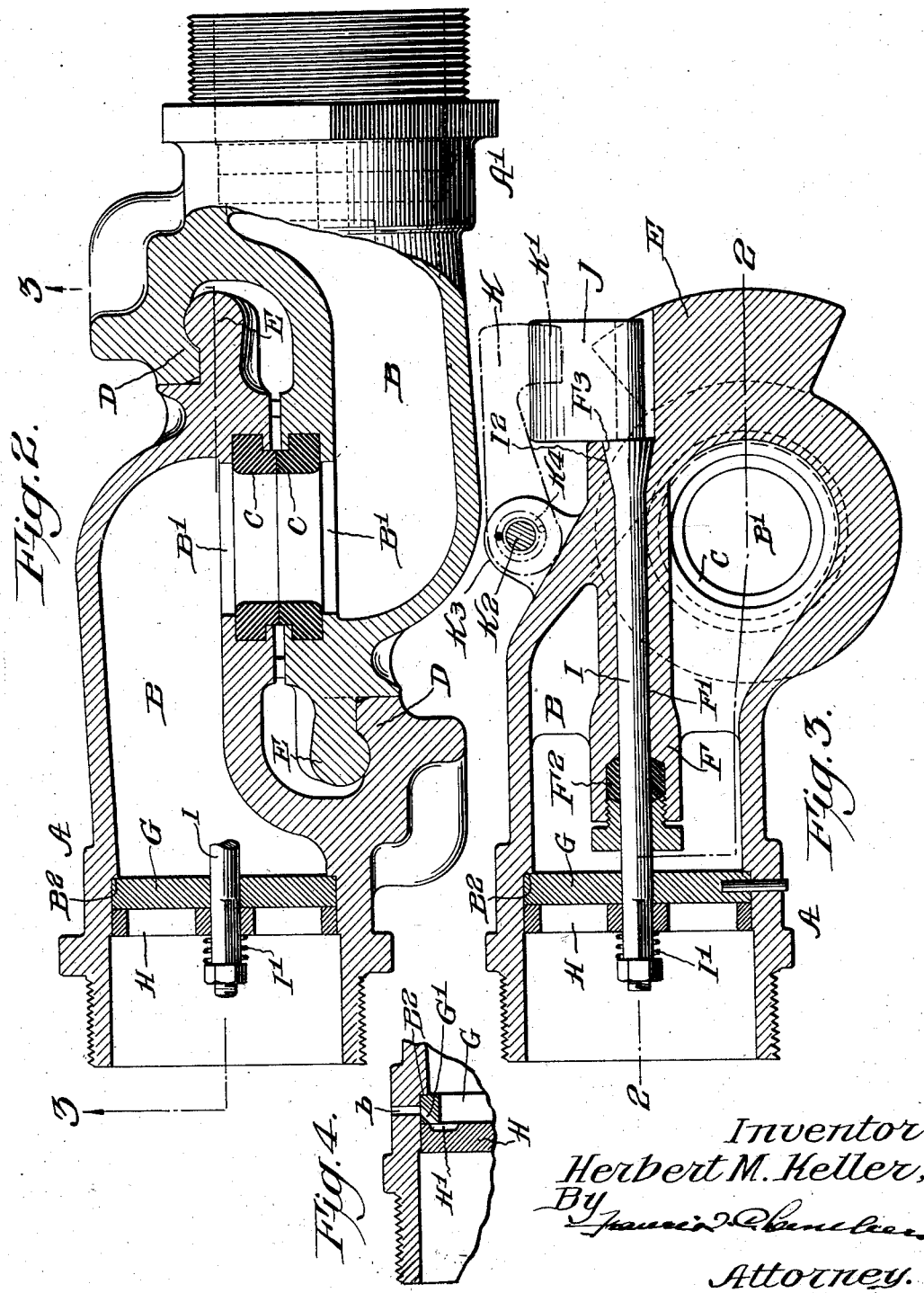
Inventor
Herbert M. Keller,
By
Attorney.

Oct. 7, 1930.  H. M. KELLER  1,777,754
AIR HOSE COUPLING
Filed Nov. 16, 1927  4 Sheets-Sheet 3
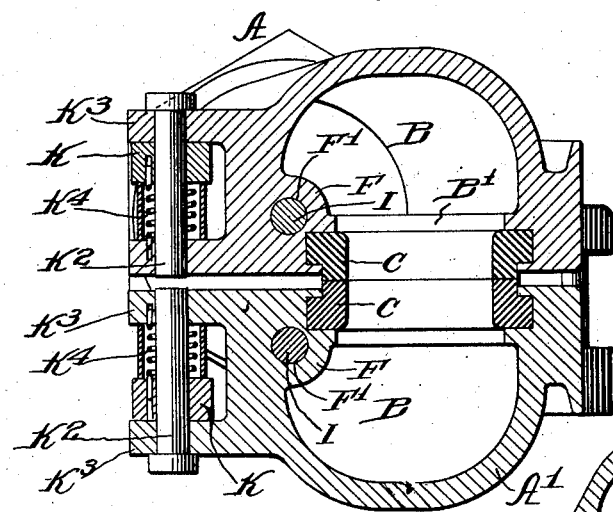
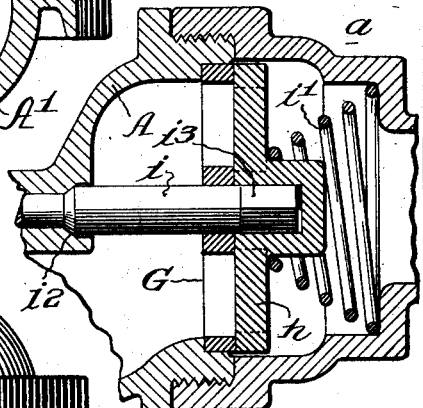
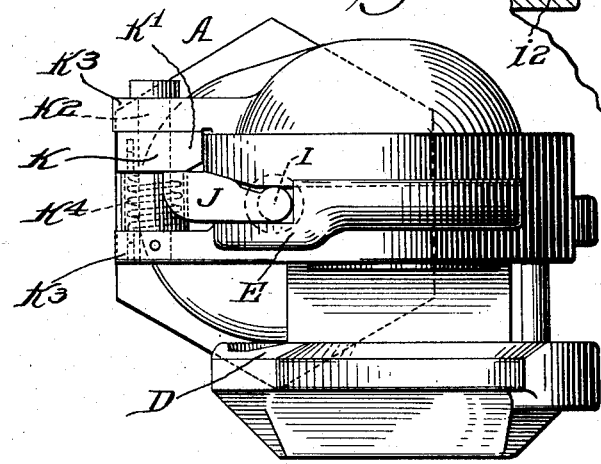
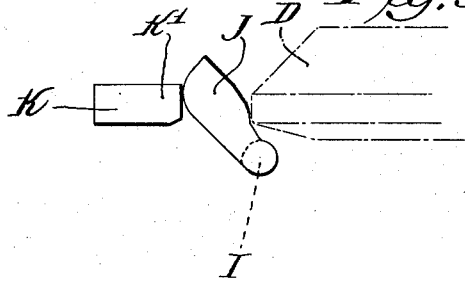
Inventor
Herbert M. Keller,
By
Francis W Chambers
Attorney

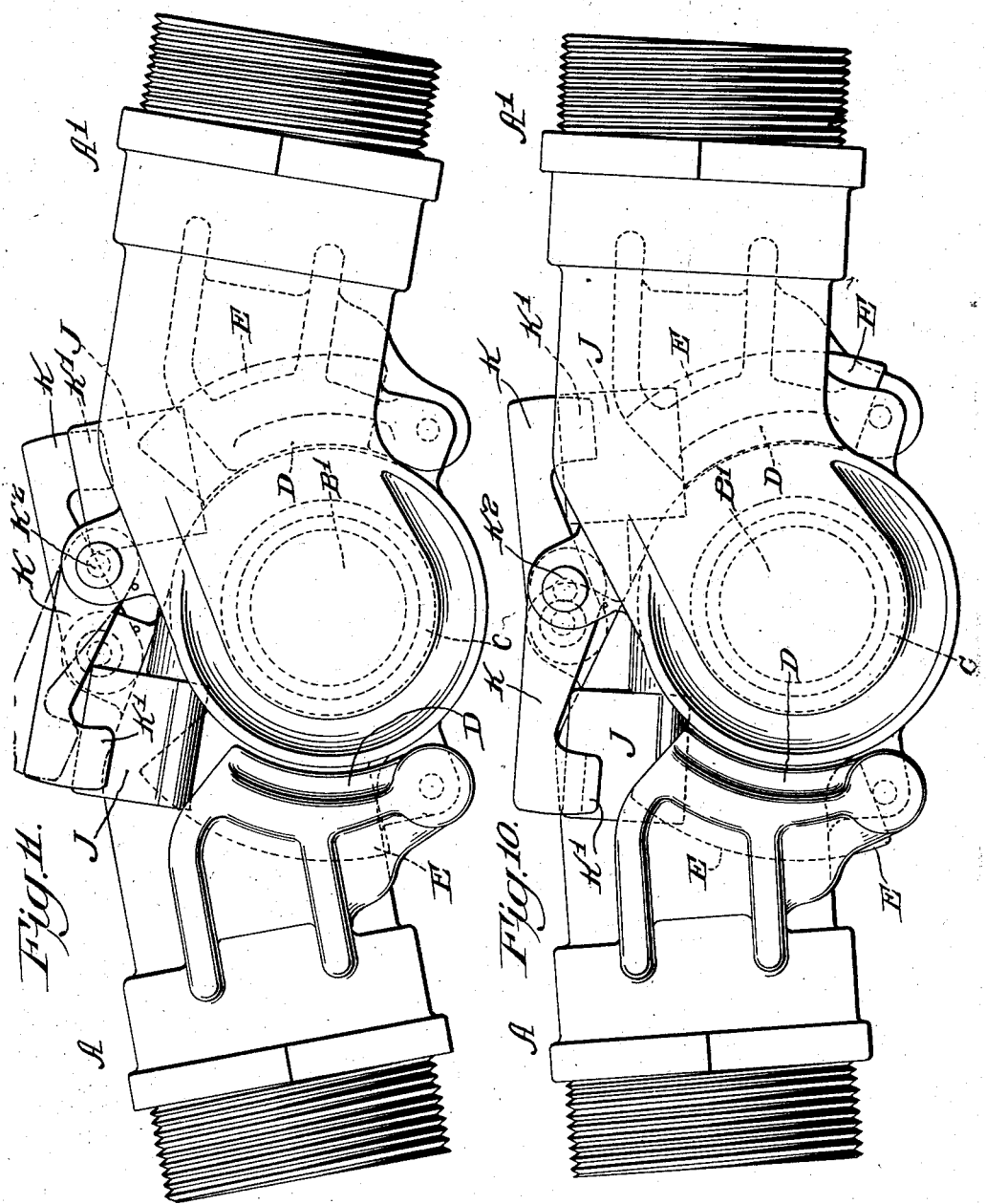

Patented Oct. 7, 1930

1,777,754

UNITED STATES PATENT OFFICE

HERBERT M. KELLER, OF GERMANTOWN, PENNSYLVANIA

AIR-HOSE COUPLING

Application filed November 16, 1927. Serial No. 233,585.

My invention relates to air brake apparatus and particularly to the coupling device used in connection with the air hose connected with the train pipes. My improvements are intended for use in connection with coupling heads or members of the standard type which are coupled and clamped together by a rotary movement about a common centre and the object of my invention is to provide such coupling members with cut off valves with valve actuating members manually operatable to close the valves with spring actuated locking means acting to engage the valve actuating member when in valve open position and manually releasable therefrom, said locking means being preferably adapted to also engage the valve actuating means when in valve closed position so as to offer resistance to the movement of said means without positively locking it and a further object of my invention is to so locate the valve actuating means of each coupling member, with reference to a relatively movable ledge of the coupled member, that said ledge will engage it, actuate it to open the valve and lock it in valve open position as the members are relatively rotated to couple with each other.

A further object of my invention is to provide the cut off valves and their seats with ports which will register with each other when the valves are closed and permit the escape of the air held in the coupled members between the valves before said members are detached from each other.

The nature of my improvements will be best understood as described in connection with the drawings in which I have illustrated couplers provided with my improvements and will be pointed out in the claims.

In the drawings—

Figure 1 is a plan view of two coupling members provided with my improvements shown in fully coupled position.

Figure 2 is a horizontal sectional view of the two coupled members taken as on the irregular section line 2—2 of Figure 3.

Figure 3 is a vertical sectional view of the coupling member A of Figure 2, taken as on line 3—3 of Figure 2.

Figure 4 is a section taken on line 4—4 of Figure 5, showing a detail.

Figure 5 is a face view of the cut off valve in closed position.

Figure 6, a similar view showing the valve open.

Figure 7 is a sectional elevation on line 7—7 of Figure 1.

Figure 8 is a front elevation of the member A showing its valve actuating lever in valve open position.

Figure 9 is a diagrammatic view showing the valve actuating lever in valve closed position and the then existing position of the locking device of its own coupling member and the actuating ledge of the coupled member.

Figure 10 is a side elevation showing the coupling members in fully coupled position.

Figure 11 is a side elevation showing the members rotated to a position in which the valve actuating lever can be manually operated to close their valves and Figure 12 is a sectional view of a modification.

The coupling members indicated at A and $A^1$ are similar and similarly equipped and for the most part they are of standard construction so that they will couple with any standard air hose coupling; the air passages B have openings $B^1$ equipped with bushings C which abut as shown in Figs. 2 and 7 when the members are coupled. Each member is provided with the standard coupling ledges D and E formed to engage and cam the members together when they are rotated about a common centre.

In the special form of embodiment of my improvement shown in the drawings, I form each coupling member with a spindle bearing $F^1$ formed in a portion of the casting indicated at F, having, as shown in Figure 3, a stuffing box at one end indicated at $F^2$ and a tapered seat at the other end indicated at $F^3$. G is the fixed seat for a rotary slide valve and is shown as seated on a ledge $B^2$ in the casting. H is the movable rotary slide valve seated on seat G and engaged with the end of a valve stem I, rotatable in the bearing $F^1$ and having a tapered end $I^2$ fitting in the tapered seat $F^3$. $I^1$ indicates a spring, the function of which is to hold the valve H against its seat G. As shown in Figs. 4, 5, and 6, I provide the seat G and valve H in addition to their regular ports for opening and closing the air passage, with ports $H^1$ and $G^1$, $G^1$ being in registry with the port $b$ in the casing and the ports $H^1$ and $G^1$ being so located that they will register when the cut off valve is fully closed.

J is a lever secured to the end of the valve spindle I and so located with reference to a ledge of the rib E that, as shown in Figure 8, it will rest against this ledge when in position to hold the valve fully open. The shape of this lever is indicated clearly in Figs. 8 and 9 and it is movable between the positions shown in Fig. 8 and the position indicated in Fig. 9, in which last position the controlled valve is fully closed. This valve lever is so shaped and located as to be conveniently operated by hand. K is a spring actuated locking lever having a downwardly projecting finger $K^1$ which engages the lever J when in the position shown in Fig. 8 and locks it in valve open position. The lever K is secured to a spindle $K^2$ supported in bearings $K^3$, $K^3$, and actuated by a spring $K^4$ which tends to keep the locking finger in the position shown in Fig. 8. The locking finger $K^1$ is so located and formed that when the lever J is moved to the valve closed position, it will rest against it, as shown in Fig. 9, in such a way as to oppose resistance to the movement of the lever to open the valve without positively locking it in valve closed position.

It will be seen that the lever J is so located and shaped that when the two members are coupled together, the lever being in valve closed position, each valve lever, when the two members are engaged together, as shown in Fig. 11, will lie directly in the path of the front edge of the locking ledge D of the coupled member so that when the coupling is completed by the rotary movement shown in Fig. 11, to that shown in Fig. 10, this ledge will press against and move the valve lever to valve opened position, shifting it from the position shown in Fig. 9 to that shown in Fig. 8. The movement of the lever raises the finger $K^1$ against the action of the spring $K^4$ and when the valve lever reaches the position shown in Fig. 8, the finger $K^1$ is spring actuated to assume the position shown in Fig. 8, in which it positively locks the lever J in valve opened position.

In the modification shown in Fig. 12, the enlarged end of the valve spindle $i$ engages by means of a squared end $i^3$ the cut off valve, here indicated at $h$ and the valve stem is provided with a tapered seat, as indicated at $i^2$. A spring $i^1$ is provided to hold the valve $h$ to its seat G.

In operation we may assume that the cut off valves of two detached coupling members are closed. The operator then partly couples the two members, as shown in Fig. 11, and then rotates the coupling members about a common centre to the position shown in Fig. 10. This final rotary movement of the two members brings the corner of the ledge D of each member into contact with the lever J of the coupled member and shifts the lever from the position shown in Fig. 9 to that shown in Fig. 8, thus opening the valves which are immediately locked in open position by the action of the locking finger $K^1$ and it will be seen that even apart from the action of the locking fingers $K^1$ the valve levers J can not be moved from valve opened position so long as the coupling members are fully coupled. I thus insure that the cut off valves shall remain open so long as the coupling members are fully coupled.

When it is desired to uncouple the coupling members, the operator rotates the members from the position shown in Fig. 10 to that shown in Fig. 11, the ledge D then assuming the relative position with regard to the valve lever of the coupled member indicated in Fig. 9. The operator can then close the valves by first raising the locking fingers $K^1$ to to the position shown in dotted lines in Fig. 11 and by then manually shifting the levers J to the position indicated in Fig. 9, thus closing the valves. The closure of the valves brings the ports $H^1$ and $G^1$ and $b$ into registry, as shown in Fig. 4, so that the air confined between the cut off valves can escape, thus facilitating the next operation which consists in further rotating the members until they are entirely detached from each other.

It is an important feature of my invention that I provide means, to wit, the fingers $K^1$, which positively lock the valve lever in valve open position so that in case of the breaking apart of a coupling I avoid the danger of the cut off valves closing since they can only be closed by the manual operation involving the lifting of the locking finger and the manual shifting of the valve lever.

Having now described my invention, what I claim as new and desire to secure by Letters Patent, is:

1. In an air hose coupling the members of which have interengaging ledges whereby they are clamped together when rotated about a common centre in opposite directions, the combination therewith of cut off valves located in each member, manually operatable valve actuating means whereby the valves can be opened and closed when the members are wholly or partially uncoupled, a ledge on each member located to engage and shift the valve actuating means of the other member to open its valve when the members are given their rotative motion to clamp them together and to hold the valves open while the members are fully coupled and spring actuated manually retractable locking means on each member located in the normal path of movement of the valve actuating means and acting automatically to engage and lock the valve actuating means in valve open position.

2. In an air hose coupling the members of which have interengaging ledges whereby they are clamped together when rotated about a common centre in opposite directions, the combination therewith of rotatable slide cut off valves located in each member, means for actuating said valves consisting of a valve spindle extending through the wall of the member and a manually operatable lever secured to the end of each spindle, a ledge on each member located to engage the valve actuating lever of the coupled member and shift it to open the valve when the members are given their rotary motion to clamp them together, said ledges being so located as to permit the manual operation of the lever to close the valves when the members are rotated to unclamp without fully uncoupling them.

3. A coupling having the features of claim 2, and in combination therewith spring actuated manually releasable locking devices located to engage and lock the valve actuating lever of each member when in valve open position.

4. A coupler having the features of claim 1, in combination with ports formed in the valves and their seats to register when the valves are closed and permit the escape of air in the coupling.

5. A coupler having the features of claim 2, in combination with ports formed in the valves and their seats to register when the valves are closed and permit the escape of air in the coupling.

HERBERT M. KELLER.